United States Patent [19]
Ristuccia

[11] 3,855,503
[45] Dec. 17, 1974

[54] REMOTELY MONITORED AND CONTROLLED TRANSFORMER

[75] Inventor: Donald J. Ristuccia, Athens, Ga.

[73] Assignee: Westinghouse Electric Corporation, Pittsburgh, Pa.

[22] Filed: Sept. 26, 1973

[21] Appl. No.: 401,097

[52] U.S. Cl. .......................... 317/27 R, 340/228 R
[51] Int. Cl. ............................................. H02h 3/28
[58] Field of Search..... 317/14 H, 14 R, 14 J, 14 G, 317/27 R, 40 R; 340/228 R

[56] References Cited
UNITED STATES PATENTS
| | | |
|---|---|---|
| 3,223,889 | 12/1965 | Schweitzer ........................ 317/27 R |
| 3,398,323 | 8/1968 | Anderson ........................ 317/40 R |
| 3,423,634 | 1/1969 | Wagner ........................... 317/14 R |

Primary Examiner—G. Harris
Attorney, Agent, or Firm—J. R. Hanway

[57] ABSTRACT

A power transformer adapted for remote monitoring and controlling, and system of providing same. The transformer contains a temperature sensor, a pressure sensor, and a de-energizing switch. Electrical signals from the sensors are transferred to a remote load management center which compares the signals to predetermined standards and originates a switching signal when a standard is exceeded. The switching signal opens the switch to de-energize the transformer. The load management center may utilize standards which are fixed or which are variable with other conditions in the power system.

10 Claims, 6 Drawing Figures

REMOTELY MONITORED AND CONTROLLED TRANSFORMER

BACKGROUND OF THE INVENTION

1. Field of the Invention

This invention relates, in general, to electrical inductive apparatus and, more specifically, to remotely monitored and controlled transformers.

2. Description of the Prior Art

Electrical power distribution transformers are susceptible to a wide range of loads which require different amounts of electrical energy. Such transformers often have protective devices associated therewith to protect the transformer and the distribution lines from excessive currents. Circuit breakers, current-limiting fuses, and protective links are used separately or in various combinations to interrupt excessive currents in the primary and/or secondary windings of the transformer.

Conventional protective devices are activated when the current flowing therethrough exceeds a predetermined value, such as an overload value above the normal rated current. Since conventional protective devices have fixed predetermined values, the maximum amount of current which may flow through the protective devices cannot be changed easily. Thus, the amount of overload current which the transformer will carry is fixed.

It is desirable in many applications to change the overload capacity of a distribution transformer. In some applications, reducing the transformer life somewhat by sustaining a moderate overload is better than interrupting the load current and causing a power outage. In other applications, the decision to interrupt load current may depend on the condition of other transformers in the distribution system, the length and magnitude of the overload, the number and type of facilities served by the transformer, as well as numerous other factors.

Therefore, it is desirable, and it is an object of this invention, to provide means for remotely monitoring and controlling conditions of distribution transformers. With such means, controlling the transformers can be governed by conditions occurring at the time control is desired, and not during the manufacturing of the transformers. It is also desirable, and it is a further object of this invention, to provide means for remotely monitoring and controlling all of the critical operating conditions of distribution transformers with a minimum of protective and switching devices.

SUMMARY OF THE INVENTION

There is disclosed herein new and useful electrical apparatus which permits remote control of a transformer according to critical conditions existing during the operation of the transformer. The temperature and pressure within the transformer enclosure are monitored by sensors and the information obtained is transferred as electrical signals to a load management center. The management center observes the electrical signals and, when such signals have a predetermined relationship with certain other conditions, a switching signal is originated by the load management center to open a switch and de-energize the transformer. The conditions governing the de-energization of the transformer may be fixed parameters concerning the allowable pressure and/or temperature. The conditions may, according to a predetermined program, depend on the instantaneous operating conditions of the particular transformer involved and/or of other transformers in the system which are monitored by the load management center.

BRIEF DESCRIPTION OF THE DRAWING

Further advantages and uses of this invention will become more apparent when considered in view of the following detailed description and drawing, in which.

DESCRIPTION OF THE PREFERRED EMBODIMENTS

Figure 1:
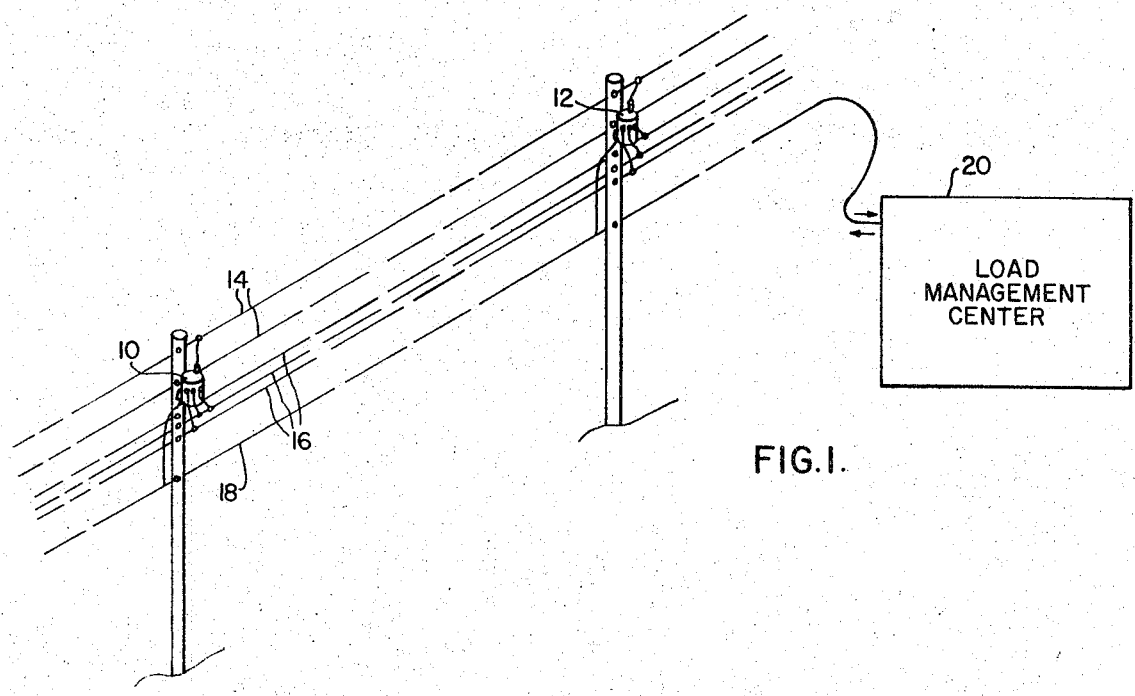
FIG. 1 is a view illustrating a remotely monitored and controlled distribution transformer system.

Throughout the following description, similar reference characters refer to similar elements or members in all the figures of the drawing.

Referring now to the drawing, and to FIG. 1 in particular, there is shown a partial view of a remotely monitored and controlled power distribution system constructed according to this invention. The transformers 10 and 12 are connected to the high voltage or primary cables 14 and to the low-voltage or secondary cables 16. The number and type of transformers, their connecting arrangements, their relative location, etc., may vary from the system shown in FIG. 1 without departing from the scope of this invention. The transformers 10 and 12 are connected to the cable 18 which is connected to the load management center 20. The cable 18 may be a telephone cable, a two-way community antenna television (CATV) cable, or any other suitable cable. The load management center 20 contains apparatus which is capable of originating a signal for disconnecting a particular transformer from the high-voltage cables 14 when certain transformer operating variables or other conditions are exceeded.

Figure 2:
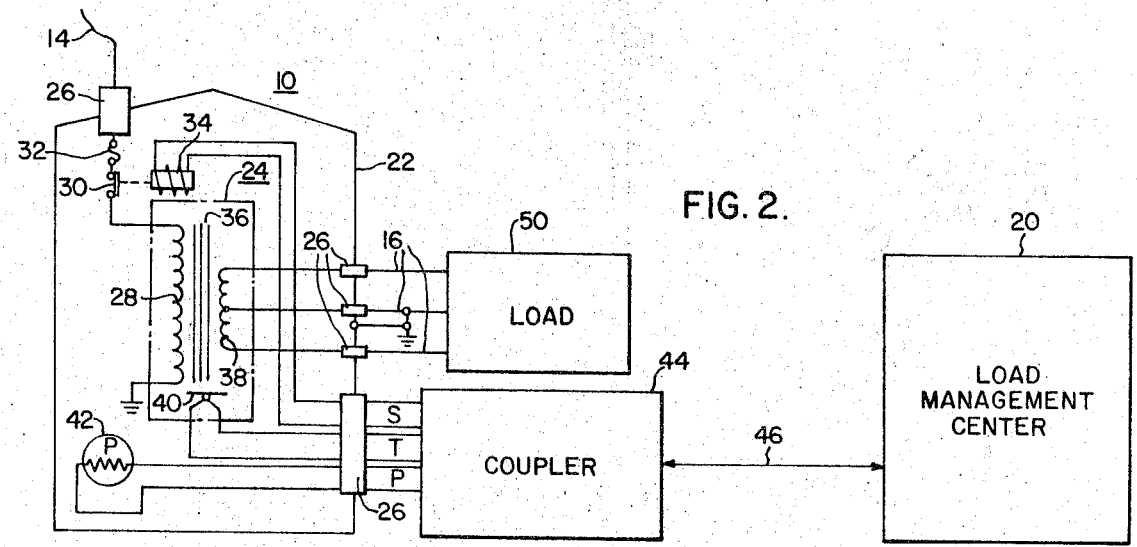
FIG. 2 is a schematic diagram of a distribution transformer and associated remote apparatus constructed according to this invention.

FIG. 2 schematically represents electrical apparatus comprising the transformer 10 and the load management center 20. The transformer 10 includes an enclosure 22, a core and coil assembly 24 contained within the enclosure 22, and electrical bushings 26 which permit electrical leads to extend through the enclosure 22. The primary winding 28 is connected, through the vacuum switch 30 and the protective link 32, to the primary cable 14. The vacuum switch 30 is operated by the solenoid 34 which is energized when the proper electrical signal is transferred across the switching channel S.

During a major fault condition, the primary current may rise very rapidly. In such cases, the protective link 32 interrupts the circuit and de-energizes the transformer 10 immediately without consulting the load management center 20. It is within the contemplation of this invention that means other than the protective link 32 may be used, such as a magnetic or thermal tripping mechanism for the switch 30, to de-energize the transformer 10 during a major fault primary current. A current-limiting fuse may also be used.

The primary winding 28 is inductively coupled to the magnetic core 36 and to the secondary winding 38. A temperature sensor, such as the thermocouple 40, is located within the core and coil assembly 24 to directly measure the temperature of these transformer components. An electrical signal, which is responsive to the temperature of the core and coil assembly 24, is originated by the thermocouple 40 and is transferred across the temperature channel T. A pressure sensor, such as the pressure responsive variable resistance element 42, is suitably located to measure the pressure within the enclosure 22. The pressure sensor can be mounted within the enclosure 22, or on the outside thereof. Details of a suitable pressure sensor are described in U.S. Pat. No. 3,816,801, which is assigned to the assignee of this invention. An electrical signal, controlled by the pressure sensor 42, is transferred across the pressure channel P.

The switching, temperature, and pressure channels are connected to a coupler 44 which appropriately processes the signals for connection to the signal transfer means 46. The signal transfer means 46 may be a cable, as illustrated in FIG. 1, a radio communication link, or any other transfer system capable of providing two-way signal paths between the coupler 44 and the load management center 20. If the transfer system 46 consists of individual line pairs, the coupler 44 may consist of only a terminal block suitable for connecting the appropriate leads from the transformer 10 to the transfer means 46. If a cable which is common to several transformers is used, the coupler 44 may contain an identifying circuit which effectively tells the load management center 20 which transformer the signals are associated with.

The load management center 20 receives the temperature and pressure signals and, depending on certain predetermined conditions, originates a switching signal which opens the switch 30 and de-energizes the transformer 10. The load management center 20 may be constructed to open the switch 30 when the load 50 on the transformer secondary winding 38 becomes excessive, or when an internal fault occurs, which normally is caused by a damaged insulation structure within the core and coil assembly 24.

Figure 3:
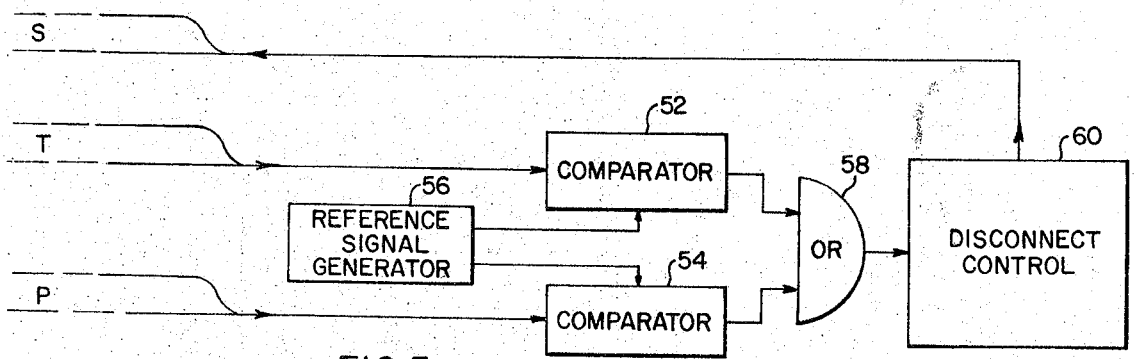
FIG. 3 is a schematic block diagram of a load management center.

FIG. 3 illustrates, in block form, a diagram of an arrangement which may be used in the load management center 20. The temperature and pressure signals, which are received from the transfer means 46, are applied to the comparators 52 and 54, respectively. The reference signal generator 56 provides a suitable reference signal for each comparator. The comparator 52 provides an output signal to the OR logic circuit 58 when the temperature signal exceeds the reference signal which is applied to the comparator 52. The comparator 54 provides an output signal to the OR logic circuit 58 when the pressure signal exceeds the reference signal which is applied to the comparator 54. When an output signal from either comparator is applied to the circuit 58, a signal is applied to the disconnect control circuit 60 which originates a switching signal to disconnect or de-energize the transformer 10.

The magnitude of the reference signals, and hence, the necessary magnitude of the temperature and/or pressure signals which are necessary to disconnect the transformer, may have fixed values, values which are dependent upon time or duration, values which are dependent on both the temperature and pressure of the transformer, various combinations of these magnitude determining parameters, or any other parameters which adequately provide reference signals to properly protect the transformer, the distribution system, and/or the load apparatus.

Figure 4:
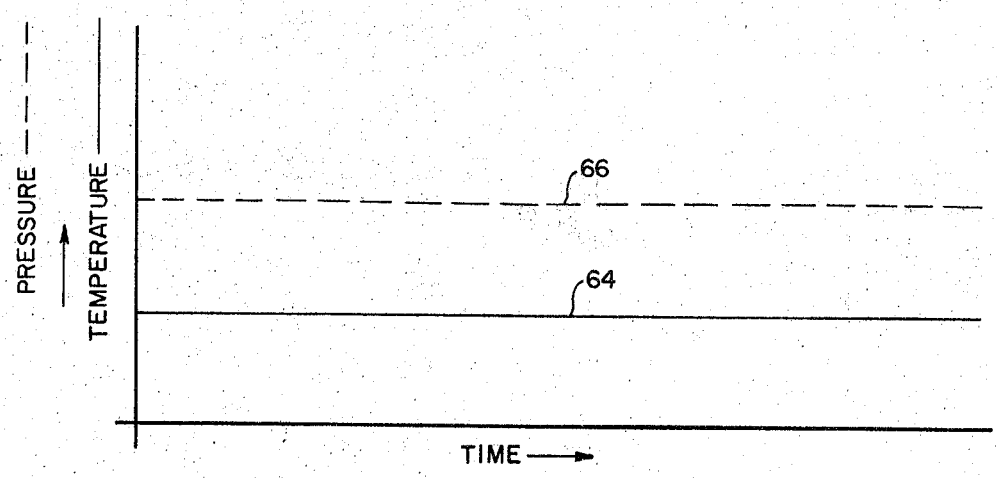
FIG. 4 is a graph illustrating transformer temperature and pressure characteristics during normal operation.
Figure 5:
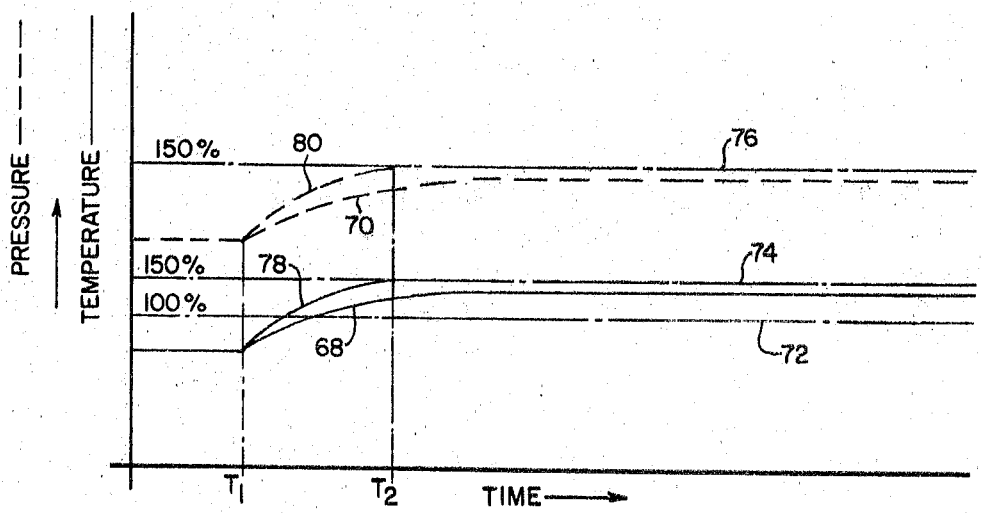
FIG. 5 is a graph illustrating transformer temperature and pressure characteristics during moderately overloaded operation.
Figure 6:
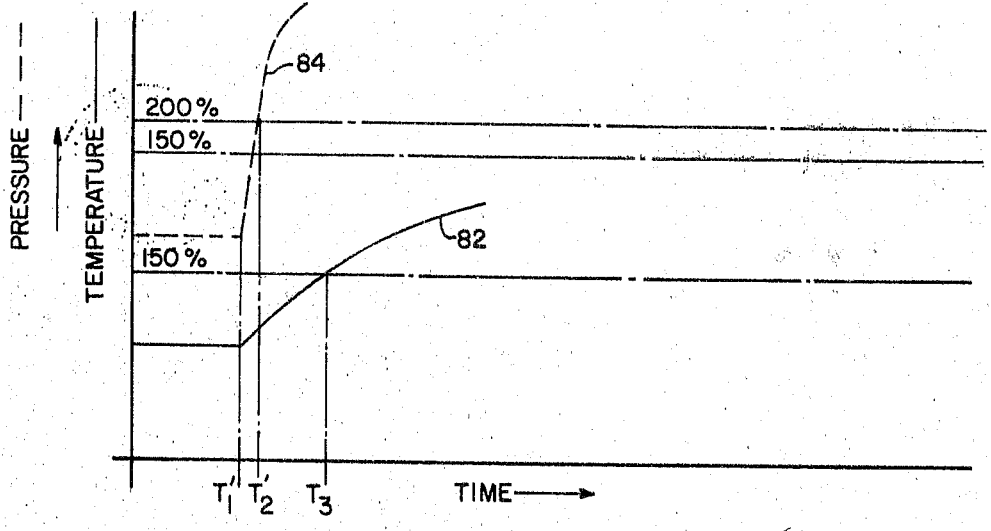
FIG. 6 is a graph illustrating transformer temperature and pressure characteristics during an internal fault condition.

FIGS. 4, 5 and 6 illustrate the functions of a load management center 20 having predetermined reference signal characteristics. In FIG. 4, the line 64 indicates a normal temperature being measured by the temperature sensor over a period of time. Typically, this normal value of temperature would be below the temperature produced when the transformer is being operated at rated, or 100 percent load power. Similarly, the line 66 indicates the normal pressure measured by the pressure sensor when the transformer is operating normally rather than operating at full capacity.

FIG. 5 represents the changes in temperature and pressure when a moderate overload is being supplied by the transformer. A moderate overload is one which exceeds the rated capacity of the transformer by an amount which does not substantially inhibit the ability of the transformer to supply the power required over a reasonable length of time. Usually, the significance of operating power distribution transformers at moderate overloads is the reduction in the overall life of the transformer. For purposes of this description only, a moderate overload will be indicated as between 100 percent and 150 percent of the rated load.

In FIG. 5, the load power delivered is increased from a normal load to a moderate overload at time $T_1$. The temperature and the pressure begin to rise as a result of the overload, as indicated by the curves 68 and 70, respectively. If the temperature increases rapidly enough, there will be some lag in the pressure curve 70 with respect to the temperature curve 68. The line 72 represents the temperature at 100 percent rated load. The line 74 represents the temperature at 150 percent rated load. The line 76 represents the pressure at 150 percent rated load. The curves 68 and 70 increase gradually until they reach the new and higher stabilized values which are slightly below the 150 percent rated load values.

In this specific embodiment, the transformer is allowed to remain energized under the conditions of a moderate overload. That is, the reference signals would have a suitable fixed value to keep the comparators from providing an output signal and originating a switching signal. If a larger overload is applied at time $T_1$, that is, a load greater than 150 percent in this specific embodiment, the temperature and pressure would increase as indicated by the curves 78 and 80, respectively. The temperature reference signal has a suitable value which causes the comparator 52 to produce an output signal when the temperature reaches the value corresponding to the 150 percent load temperature. This occurs at time $T_2$ as illustrated in FIG. 5. Thus, the transformer would be de-energized at time $T_2$.

FIG. 6 represents the changes in temperature and pressure which occur when an internal fault occurs within the monitored transformer. The internal fault, which occurred at time $T_1$, causes the temperature and pressure indicated by the curves 82 and 84, respectively, to increase at different rates. This is characteristic of internal faults since the pressure is increased not only because of the increase in temperature, but because of the addition of gases which are liberated from decomposing dielectric and insulation in the vicinity of arcs which are usually present during internal faults.

As shown in FIG. 6, the temperature curve 82, if the transformer is not otherwise de-energized, would reach the 150 percent overload level to initiate a switching signal at time $T_3$. However, if this was allowed to happen, the pressure would have become dangerously high and a voilent failure of the transformer would probably have occurred. Therefore, measurement of temperature alone would not satisfactorily protect the transformer and the surroundings. To provide adequate protection, the reference signal applied to the comparator 54 has a value which causes the comparator 54 to provide an output signal when the monitored pressure exceeds a predetermined value. The predetermined value is greater than a moderately overloaded value but less than the value at which the transformer enclosure would rupture. In this specific embodiment, the value is 200 percent of that which occurs during rated load conditions. Thus, when the pressure reaches, at time $T_2'$, 200 percent of the value which normally occurs at rated load, the transformer is de-energized.

The overall response of the load management center 20 adjusted to the values previously mentioned allows the transformer 10 to operate until the temperature reaches 150 percent of the rated value, or until the pressure reaches 200 percent of the rated value. Using temperature signals alone would not provide adequate protection since it is possible for the pressure to rise excessively before the temperature reaches the switching level. Using pressure signals alone would not provide adequate protection since, when the temperature increases are relatively fast, there is a time delay between the corresponding pressure increases.

The values to which the reference signals are established, and any variance thereof with operating parameters, are dependent upon the factors which are to to be protected by the system, such as transformer life, customer service continuity, explosion hazard, etc. Many other fixed or variable reference values may be used without departing from the scope of the invention.

A particular advantage of the present invention is its ability to determine whether the transformer should be de-energized depending on various conditions existing at the time of the overload, such as the ability of other transformers to carry the load, the number of customers affected, etc. Such control of the transformer would be achieved by a suitably programmed device, or computer, which could change the reference signals. The various combinations are unlimited, and would be largely determined by the electric utility company having control over the load management center.

Since numerous changes may be made in the above-described apparatus, and since different embodiments of the invention may be made without departing from the spirit thereof, it is intended that all of the matter contained in the foregoing description, or shown in the accompanying drawing, shall be interpreted as illustrative rather than limiting.

I claim as my invention:

1. Electrical apparatus comprising:
   an enclosure;
   a core and coil assembly disposed within said enclosure;
   temperature sensing means which electrically responds to the temperature of said core and coil assembly to provide a temperature signal which is detectable outside said enclosure;
   pressure sensing means which electrically responds to the pressure within said enclosure to provide a pressure signal which is detectable outside said enclosure; and
   switching means for disconnecting the coil from an energizing voltage, said switching means being responsive to an electrical switching signal which is originated from outside said enclosure.

2. The electrical apparatus of claim 1 including:
   transfer means for conveying signals, said transfer means having first and second ends;
   coupling means for connecting the first end of said transfer means to the temperature, pressure, and switching means; and
   a load management center which is connected to the second end of said transfer means, said load management center originating the switching signal which disconnects the coil from the energizing voltage, said switching signal being originated in response to predetermined conditions of the temperature and pressure signals.

3. The electrical apparatus of claim 2 wherein a switching signal is originated by the load management center when the temperature signal corresponds to a coil assembly temperature which exceeds a first predetermined temperature, said first predetermined temperature being greater than the coil assembly temperature during normal full load operation.

4. The electrical apparatus of claim 2 wherein a switching signal is originated by the load management center when the pressure signal corresponds to an enclosure pressure which exceeds a first predetermined pressure, said first predetermined pressure being greater than the enclosure pressure during moderately overloaded operation.

5. The electrical apparatus of claim 2 wherein a switching signal is originated by the load management center when the temperature signal corresponds to a coil assembly temperature which exceeds a first predetermined temperature, and a switching signal is originated by the load management center when the pressure signal corresponds to an enclosure pressure which exceeds a first predetermined pressure, said first predetermined pressure being greater than the pressure produced, during constant load conditions, when the first predetermined temperature is produced.

6. The electrical apparatus of claim 1 wherein the temperature sensing means comprises a thermocouple located substantially within the structure of the core and coil assembly.

7. The electrical apparatus of claim 1 wherein the pressure sensing means comprises resistance means which changes electrical resistance in response to a change in the sensed pressure.

8. The electrical apparatus of claim 1 wherein the switching means comprises a vacuum switch located within the enclosure.

9. The electrical apparatus of claim 1 wherein a current operated protective device is connected in series circuit relationship with the coil and the energizing voltage.

10. The electrical apparatus of claim 2 wherein the load management center comprises:

means for comparing the temperature signal with a first reference signal;

means for comparing the pressure signal with a second reference signal; and means for originating a switching signal when either comparing means acquires a predetermined output signal in response to the comparisons.

* * * * *